United States Patent [19]

Kawabata

[11] Patent Number: 5,049,186

[45] Date of Patent: Sep. 17, 1991

[54] WATER-BASED PROTECTIVE COMPOSITIONS FOR COATING FILMS

[75] Inventor: Nobuaki Kawabata, Yokohama, Japan

[73] Assignee: Nippon Oil Co., Ltd., Tokyo, Japan

[21] Appl. No.: 494,303

[22] Filed: Mar. 16, 1990

[30] Foreign Application Priority Data

Mar. 17, 1989 [JP] Japan .................................. 1-063600

[51] Int. Cl.$^5$ ................................................ C09D 5/20
[52] U.S. Cl. ............................................ 106/2; 106/270;
106/271; 106/272; 106/245; 106/267; 106/268;
106/901; 427/154; 427/155; 427/156; 524/269;
524/276; 524/261; 524/277; 524/475
[58] Field of Search .................... 106/2, 270, 271, 272,
106/245, 267, 268, 901; 427/155, 156, 154;
524/269, 276, 261, 277, 475

[56] References Cited

U.S. PATENT DOCUMENTS

| | | | |
|---|---|---|---|
| 4,218,252 | 8/1980 | Yokoyama | 106/31 |
| 4,218,263 | 8/1980 | Kawabata | 106/270 |
| 4,315,957 | 2/1982 | Hereth et al. | 427/155 |
| 4,339,276 | 7/1982 | Yokoyama et al. | 106/271 |
| 4,468,254 | 8/1984 | Yokoyama et al. | 106/271 |
| 4,594,109 | 6/1986 | Kawabata | 106/271 |

FOREIGN PATENT DOCUMENTS 2334868  3/1974  Fed. Rep. of Germany .
56-30412  3/1981  Japan .

OTHER PUBLICATIONS

Chemical Abstracts, Abstract of U.S. 4,358,564; CA 98(14):108023x, Ames.

*Primary Examiner*—William R. Dixon, Jr.
*Assistant Examiner*—Scott L. Hertzog
*Attorney, Agent, or Firm*—Cushman, Darby & Cushman

[57] ABSTRACT

Water-based compositions of the water-based wax emulsion type for protecting coating films are provided by emulsifying and dispersing, as essential components, [A] a disperse phase component and [B] an emulsifier component in water. The disperse phase component [A] is formed of (a) a petroleum fraction wax having a melting point of 50°–90° C., (b) an oxygen-containing wax having an oxygen content of at least 3.0 wt. % and a melting point of 50°–85° C., (c) an ethylene/α-olefin copolymer having a number average molecular weight of 2,000–20,000, and (d) a higher fatty acid metal salt and/or a metal-modified hard wax. The compositions can form, without the need for a solvent, strong barrier coats which are resistant to rain, moisture, sunlight and air pollutants even under severe environmental conditions. After these barrier coats are used, they can be easily removed with warm water containing a small amount of a solvent or steam.

21 Claims, No Drawings

WATER-BASED PROTECTIVE COMPOSITIONS FOR COATING FILMS

BACKGROUND OF THE INVENTION a) Field of the Invention

The present invention relates to water-based protective compositions for coating films. Specifically, the present invention is concerned with water-based protective compositions which can be applied onto painted or otherwise coated surfaces of motor vehicles, agricultural machines, construction machines and other machines and equipment for their temporary protection.

b) Description of the Prior Art

Commodities such as motor vehicles are prone to fouling, staining, smear or the like at painted or otherwise coated surfaces by wind and rain, moisture, sunlight, air, iron powder, bird droppings, pollutants in the air such as soot, etc. during the periods until they are delivered to end consumers. Their commercial values are hence impaired by these staining To prevent such fouling, various compositions been developed for the protection of coating films in recent years. Developed for such purposes include wax-solvent dispersions (e.g., Japanese Patent Laid-Open No. 28534/1975), removable barrier coats (removable when they become no longer needed; for example, Japanese Patent Publication No. 7303/1979), wax-solid powder-solvent dispersions (hand-wiping is feasible; for example, Japanese Patent Laid-Open No. 149188/1976 or 62978/1980), water-base emulsions (a wax is emulsified and dispersed; for example, Japanese Patent Publication No. 34030/1970), water-base wax-powder dispersions (a wax is emulsified, followed by further dispersion of powder; for example, Japanese Patent Laid-Open No. 177073/1982, U.S. Pat. Nos. 4,442,140 and 4,594,109), acrylic polymer emulsions (an acrylic polymer is emulsified and dispersed; for example, Japanese Patent Publication No. 50517/1980 or Japanese Patent Laid-Open No. 253673/1987), etc.

Among these, wax-solvent dispersions and wax-solid powder-solvent dispersions are widely used these days. These protective compositions however require substantial evaporation of their solvents for the formation of wax barrier coats. Drawbacks of such solvent-type protective compositions, especially, pollution problems, wasting of natural resources, economy and safety are highlighted in recent years. Protective compositions of the wax-solvent dispersion type can show excellent protective performance for coating films. They are however accompanied by the problem that wax barrier coats firmly adhere under the severe environmental conditions in the middle east and tropical regions and they can no longer be removed easily. With a view toward improving this problem, protective compositions of the wax-solid powder-solvent dispersion type have been proposed. These compositions are designed to form wax barrier coats having physical strength low enough to permit removal by hand-wiping. They are however accompanied by the drawbacks that they cannot provide satisfactory protection and their barrier coats are susceptible to separation when touched by hand and are prone to acid rain staining.

On the other hand, water-base wax emulsions do not involve pollution or safety problems because they use no solvent. They are however required to have new properties different from those required for solvent-type wax emulsions, as typified by dryability and water dispersibility. In addition, protective barrier coats which are formed by coating such water-based wax emulsions are required to have the mutually-contradictory properties that they should be strong enough to withstand rain and moisture but they should permit easy removal when they become no longer needed. To the best knowledge of the inventors, compositions of the water-based wax emulsion type capable of meeting these performance and property requirements have not been developed yet.

SUMMARY OF THE INVENTION

The present inventors therefore have strived to improve conventional coating-film protecting compositions of the wax-solvent dispersion type with a view toward overcoming the aforementioned problems while retaining their excellent coating-film protecting performance, leading to the completion of the present invention.

An object of the present invention is hence to provide a water-based protective composition for coating films, which composition is of the water-based wax emulsion type, can form, without using a solvent, a strong barrier coat resistant to rain, moisture, sunlight and pollutants in the air even under severe environmental conditions, and can be easily removed with warm water containing a small amount of a solvent or steam after its use.

In one aspect of the present invention, there is thus provided a water-based composition for protecting coating films, which comprises, in a form emulsified and dispersed in water, the following essential components:

[A] 100 parts by weight of a disperse phase component comprising:
  (a) 100 parts by weight of a petroleum fraction wax having a melting point of 50°–90° C.,
  (b) 20–75 parts by weight of an oxygen-containing wax having an oxygen content of at least 3.0 wt. % and a melting point of 50°–85° C.,
  (c) 10–50 parts by weight of an ethylene/α-olefin copolymer having a number average molecular weight of 2,000–20,000, and
  (d) 5–30 parts by weight of a higher fatty acid metal salt and/or a metal-modified hard wax; and

[B] 1–20 parts by weight of an emulsifier component.

The water-based composition according to the present invention, which is useful in protecting coating films, has the following merits:

(1) Since they are of the water-based solventless type, they are free from the potential danger of pollution and fire, and they can also avoid wasting of natural resources and are hence economical.

(2) They can form barrier coats which have excellent weatherability even under severe environmental conditions.

(3) The barrier coats also have excellent waterproofness, heat resistance and dryability.

(4) The barrier coats also have superb protective properties for coating films.

(5) They are imparted with sufficient removability and can hence be removed easily with warm water containing a small amount of kerosene.

The water-based protective composition according to the present invention is accordingly most suitable for protecting coatings of motor vehicles and the like.

DETAILED DESCRIPTION OF THE INVENTION

The present invention will hereinafter be described in more detail.

The disperse phase component [A] in the present invention is composed of the following components (a)–(d):

The component (a) essential for the practice of the present invention is a petroleum fraction wax having a melting point of 50°–90° C., preferably 65°–85° C. Specific examples of the petroleum fraction wax include paraffin wax, microcrystalline wax, and unrefined paraffin waxes such as slack wax and scale wax. If the melting point of the component (a) is lower than 50° C., the resulting composition can give only coats having insufficient heat resistance so that the coats undergo run-away or develop release and oozing of the wax. However, melting points higher than 90° C. result in poor emulsibility and removability.

The component (b) indispensable upon practice of the present invention is an oxygen-containing wax having an oxygen content of at least 3.0 wt. %, preferably at least 5.0 wt. % and having a melting point of 50°–85° C. The term "oxygen content" as used herein means an oxygen content as measured in accordance with the improved Unterzaucher method (thermal conductivity method). Details of this measuring method is disclosed, for example, by Robert Clumo in Mikrochimica Acta, 1968, 811. An oxygen-containing wax whose oxygen content is at least 3.0 wt. % can be easily emulsified with a small amount of an emulsifier, so that the use of such an oxygen-containing wax can avoid or minimize emulsifier-induced reductions in dryability, waterproofness and weatherability. The melting point of the oxygen-containing wax preferably ranges from 50° C. to 85° C. Use of a wax whose melting point is lower than 50° C. lead to run-away of the resulting barrier coats at high temperatures, while use of a wax having a melting point higher than 85° C. result in the formation of barrier coats which can be hardly removed with warm water.

Exemplary oxygen-containing waxes suitable as the component (b) include natural waxes such as carnauba wax, montan wax, rice-bran wax, beeswax and japan wax (*Rhus succedaneum*) as well as synthetic waxes such as oxidized microcrystalline wax and oxidized paraffin wax, secondary modified products thereof, and maleic waxes obtained by addition reactions between hydrocarbon waxes and maleic anhydride.

Oxygen-containing waxes preferred as the oxygen-containing wax (b) in the present invention can each be obtained by reacting 3–25 parts by weight of an unsaturated polycarboxylic acid or an anhydride thereof to 100 parts by weight of a hydrocarbon wax whose melting point is in a range of 50°–85° C. Details of their production process are disclosed, for example, in Japanese Patent Laid-Open No. 6094/1974.

Oxygen-containing waxes more preferred as the oxygen-containing wax (b) in the present invention can each be obtained by mixing 10–80 parts by weight of a petroleum fraction wax having a melting point of 50°–85° C. with 90–20 parts by weight of a polyolefin wax having a melting point of 36°–120° C., a number average molecular weight of 310–1,000 and containing 5–50 double bonds per 1,000 carbon atoms and then reacting 3–25 parts by weight of an unsaturated polycarboxylic acid or an anhydride thereof to 100 parts by weight of the resultant mixture under free-radical-yielding conditions. Details of their production process are disclosed, for example, in U.S. Pat. No. 4,218,263.

The oxygen-containing wax (b) defined in the present invention has excellent emulsibility. This makes it possible to reduce the amount of the emulsifier upon formation of the wax into the water-based composition. Accordingly, the waterproofness, dryability, weatherability and the like are not lowered. The oxygen-containing wax (b) has a relatively low melting point and does not exhibit adhesiveness. It can therefore be removed easily with kerosene-containing warm water. The component (b) can be incorporated in a proportion of 20–75 parts by weight, preferably 30–60 parts by weight per 100 parts by weight of the component (a) described above. Proportions smaller than 20 parts by weight result in insufficient dispersibility, thereby failing to provide uniform barrier coats. On the other hand, proportions greater than 75 parts by weight lead to the formation of protective barrier coats having insufficient heat resistance, so that the protective barrier coats undergo run-away. Such unduly smaller or greater proportions are not preferred accordingly.

The component (c) also indispensable for the practice of the present invention is an ethylene/α-olefin copolymer having a number average molecular weight of 2,000–20,000, preferably 5,000–10,000. If the number average molecular weight is smaller than 2,000, the resulting protective barrier coats do not have sufficient heat resistance and undergo cracking and run-away. If the number average molecular weight is greater than 20,000 on the other hand, the copolymer has poor emulsibility so that no uniform barrier coats can be obtained. Such excessively low or high number average molecular weights therefore cause cracking and separation of resulting barrier coats, so that they are not preferred. In the component (c), the content of ethylene moieties is preferably 35–65 wt. % with 45–60 wt. % being more preferred. In the component (c), ethylene and the α-olefin may be copolymerized either in random or in blocks. Two or more α-olefins of different kinds may also be copolymerized. As the α-olefin, those having 3–50 carbon atoms, preferably 3–20 carbon atoms can be used. Specific examples include propylene, 1-butene, 1-pentene, 1-hexene, 4-methyl-1-pentene, 3-methyl-1-pentene, 1-heptene, 1-octene, 1-nonene, 1-decene, 1-undecene, 1-dodecene, 1-tridecene, 1tetradecene, 1-pentadecene, 1-hexadecene, 1-heptadecene, 1octadecene, 1-nonadecene and 1-eicosene. Two or more of these α-olefins may also be used in combination.

The proportion of the component (c) is 10–50 parts by weight, preferably 25–40 parts by weight per 100 parts by weight of the component (a). Proportions smaller than 10 parts by weight result in the formation of protective barrier coats having insufficient weatherability, so that the protective barrier coats develop cracking and exhibit poor removability. On the other hand, proportions greater than 50 parts by weight lead to the formation of protective barrier coats which are sticky and show poor removability. Such unduly low or high proportions are hence not preferred.

The component (d) also essential for the practice of the present invention comprises one or more compounds selected from the group consisting of higher fatty acid metal salts and metal-modified hard waxes. As the higher fatty acid metal salts, alkali metal salts, alkaline earth metal salts and other metal salts of fatty acids containing 12–18 carbon atoms are used preferably.

Specific examples include lithium laurate, sodium laurate, potassium laurate, magnesium laurate, calcium laurate, barium laurate, aluminum laurate, zinc laurate, lithium myristate, sodium myristate, potassium myristate, magnesium myristate, calcium myristate, barium myristate, aluminum myristate, zinc myristate, lithium palmitate, sodium palmitate, potassium palmitate, magnesium palmitate, calcium palmitate, barium palmitate, aluminum palmitate, zinc palmitate, lithium stearate, sodium stearate, potassium stearate, magnesium stearate, calcium stearate, barium stearate, aluminum stearate and zinc stearate. Two or more of these higher fatty acid metal salts may also be used in combination.

Exemplary metal-modified hard waxes usable as the component (d) include those obtained by modifying, with a metal, petroleum fraction waxes such as paraffin wax, microcrystalline wax, slack wax and scale wax, synthetic waxes such as polyethylene wax, oxidized microcrystalline wax, oxidized paraffin wax and maleic waxes, and natural waxes such as carnauba wax, montan wax, rice-bran wax, beeswax and japan wax. Examples of the metal include alkaline earth metals such as magnesium, calcium and barium. Among these, calcium is preferred. Described specifically, waxes described in U.S. Pat. No. 4,082,558 by way of example can be used.

The proportion of the component (d) is 5–30 parts by weight, preferably 10–20 parts by weight per 100 parts by weight of the component (a). Proportions smaller than 5 parts by weight result in the formation of protective barrier coats having poor heat resistance, so that the protective barrier coats may undergo run-away. Proportions greater than 30 parts by weight however lead to insufficient emulsification, thereby failing to provide uniform barrier coats. Such excessively small or large proportions are hence not preferred.

The emulsifier component [B] usable in the present invention can be chosen from a wide range of general emulsifiers. Nonionic, cationic and anionic emulsifiers are all usable. Of these, cationic emulsifiers are particularly effective in that they can ionize and activate acid groups of the oxygen-containing wax (b). For example, morpholine can be used preferably. Exemplary nonionic emulsifiers include polyoxyethylene alkylphenyl ethers, polyoxyethylene alkyl ethers, sorbitan fatty acid esters and polyoxyethylene sorbitan fatty acid esters. Greater effects can be brought about when in addition to a cationic emulsifier, an anionic emulsifier, for example, oleic acid is added further in an amount smaller than the equivalent weight of the cationic emulsifier.

The proportion of the emulsifier component [B] is 1–20 parts by weight., preferably 6–15 parts by weight per 100 parts by weight of the disperse phase component [A]. If the proportion is smaller than 1 part by weight, the resultant composition has insufficient emulsibility and hence separate into two layers. If the proportion is greater than 20 parts by weight, the resultant composition has poor dryability and barrier coats formed therefrom are separated by rain. Such unduly low or high proportions are therfore not preferred.

The individual components which make up the composition of the present invention have been described above in detail. The composition of the present invention can be prepared by using in combination the individual components [A] and [B] as essential components and emulsifying and dispersing them in water. The emulsification and dispersion can be conducted using any suitable method known in the present field of art. It is preferred to use the components [A] and [B] in a total amount of 5–100 parts by weight per 100 parts by weight of water.

In addition with the above essential components, the composition of the present invention may be added further with one or more of antioxidants, ultraviolet absorbers, wax dispersants and the like as needed to an extent not impairing its excellent protective performance for coating films.

EXAMPLES

The present invention will hereinafter be described specifically by the following examples. It should however be born in mind that this invention is not limited to them. Designations of "part" or "parts" and "%" will mean part or parts by weight and wt. % unless otherwise specifically indicated.

EXAMPLE 1

(i) Synthesis of oxygen-containing wax (b)

A petroleum fraction wax and a polyolefin wax were mixed in equal amounts to provide a mixed synthetic wax. Employed as the petroleum fraction wax was 155° F. microcrystalline wax (melting point: 70° C.) which had been obtained through conventional separation and refining steps. As the polyolefin wax, was used a white wax-like substance which was a low polymerization product of ethylene and had a melting point of 39° C., a penetration of at least 80, an average molecular weight of 320, and 42 double bonds per 1,000 carbon atoms. The double bonds consisted of 88% of the vinyl type, 11% of the vinylidene type and 1% of the internal vinylene type.

Twelve parts of maleic anhydride were added to 100 parts of the mixed synthetic wax. While the resultant mixture was stirred under heat at 165° C., a solution of 1 part of di-tert-butyl peroxide in 5 parts of xylene was added. After stirring the thus-obtained mixture for 30 minutes, volatile materials were eliminated under reduced pressure. The residue was filtered under pressure, whereby an oxygen-containing wax of a pale yellow color was obtained. The oxygen-containing wax had a melting point of 73° C., a penetration of 26, an acid value of 85, a saponification value of 85, and an oxygen content of 6.0%.

(ii) Preparation of water-based protective composition suitable for use in protecting coating films Placed in a 2-l stainless steel beaker were (a) 18 g (100 parts) of a petroleum fraction wax whose melting point was 80° C., (b) 9 g (50 parts) of the oxygen-containing wax synthesized in the above procedure (i), (c) 6 g (33.3 parts) of an ethylene/α-olefin copolymer (number average molecular weight: 8,000; content of ethylene moieties: 50%), and (d) 2 g (11.1 part) of calcium stearate. The contents were heated and stirred at 120° C. into a uniform solution, to which 3 g (16.7 parts) of morpholine were then added as the component [B]. While the mixture was vigorously stirred, 65 g (361 parts) of hot water of 95° C. were slowly added so that a uniform white emulsion was obtained. The emulsion was passed at 89° C. and 300 kgf/cm$^2$ through a homogenizer, whereby a good white wax emulsion was obtained. It was provided as a water-base composition suitable for use in protecting coating films. Properties of the wax emulsion were as follows:

Viscosity (20° C.): 195 cps.
Average droplet size: 0.60 μm.

Specific gravity: 0.98.

The following performance evaluation test were conducted with respect to the water-based protective composition. The results are summarized in Table 1.

Performance evaluation methods

Test pieces employed in the following tests were prepared in the following manner.

Coated plates which had been obtained by baking a black aminoalkyd resin on mild steel plates of 150 mm × 70 mm (1 mm thick) were used as test pieces. The emulsion was sprayed and coated onto the test pieces through a nozzle. The test pieces were left over at room temperature for 24 hours to dry the emulsion thus coated. Calculating from the weight, the thickness of each wax barrier coat was 15 μm on average.

Tests (1) Appearance of protective barrier coats (2) Heat resistance test

Each test piece was held upright in a constant-temperature chamber and was left over at 80° C. for 96 hours. The wax barrier coat was observed for runaway, cracking and other changes. The wax barrier coat was then washed with detergent-containing warm water and then wiped with gauze. The alkyd coating was observed for delustering, blister and other changes. The observation results are expressed by the following three-stage ranking system:
 A: No changes were observed.
 B: Slight changes were observed.
 C: Some changes were observed.

(3) Accelerated weatherability test

Coating film test

Each test piece was placed in a sunshine weatherometer and was tested at 63° C. for 250 hours while cold water was sprayed for 18 minutes at intervals of 2 hours. After the wax barrier coat was removed, the coated surface (coating film) was observed for stains, spots, delustering and other changes. The observation results are expressed by the following four-stage ranking system:
 A: No changes were observed.
 B: Extremely small changes were observed.
 C: Some changes were observed.
 D: Substantial changes were observed.

Removability test

Each test piece was set on a removability testing machine prescribed in JIS Z0236 (rust preventive oil). A wiper having a total weight of 75 g was reciprocated over 30 mm at a frequency of 30 times per minute. The wiper was designed to permit continuous oozing of kerosene by applying a felt wick to a tip of a glass tube. The number of wiping operations (the number of reciprocations) when the wax barrier coat had been completely removed as a result of the wiping with the kerosene-soaked felt wick was recorded. The results were evaluated by the following ranking system:
 A: Within 4 times.
 B: 5-7 times.
 C: 8-10 times.
 D: 11 times and more.

(4) Protection test

Soot resistance test

On each test piece, 0.5 g of soot of pH 2, whose sulfuric acid concentration was 0.5%, was placed in the form of a ball. The test piece was maintained at 70° C. for 2 hours in a constant-temperature chamber. After the test, the wax barrier coat was removed with kerosene. After the test piece was dried in the air, the coating surface was observed. The results were evaluated by the following 3-stage ranking system:
 A: No spot-like discoloration was observed.
 B: Some discoloration was observed.
 C: Distinct spot-like discoloration was observed.

Sulfuric acid resistance test

On the barrier coat of each test piece, 0.1 ml of 6% sulfuric acid was placed in the form of a droplet. The test piece was left over at room temperature for 24 hours. After the test, the barrier coat was washed off with detergent-containing warm water and then dried in the air. The test piece was observed for the degrees of discoloration and corrosion at the location where sulfuric acid was placed. The results were evaluated by the following three-stage ranking system:
 A: No spot-like discoloration was observed.
 B: Some spot-like discoloration was observed.
 C: Distinct spot-like discoloration was observed.

(5) Outdoor weatherability test

Barrier coat test

After each test piece was exposed to sunlight for 3 months in summer, the wax barrier coat was observed for changes. The results are expressed by the following four-stage ranking system:
 A: No changes were observed.
 B: Extremely small changes were observed.
 C: Some changes were observed.
 D: Substantial changes were observed.

Coating film test

The wax barrier coat was removed with warm water which contained 5% of kerosene. The thus-exposed coated surface (coating film) was observed for stains, spots, delustering and other changes. The evaluation of the results was conducted in a similar manner to the coating film test at (3).

Removability test

An automobile door (black) was coated with an emulsion by using an air spray gun. After the door was exposed to sunlight for 3 months in summer, the wax barrier coat was removed with warm water containing 5% of kerosene. The readiness of removal was expressed by the following four-stage ranking system.
 A: Easily removable.
 B: Substantially removable.
 C: A little difficult to remove.
 D: Unremovable (6) Emulsion stability test The stability of each emulsion was evaluated by the following ranking system:
 A: No changes in viscosity, appearance and the like after left over at room temperature for 1 month.

B: Some changes were observed in viscosity, appearance and the like, but they caused no problems upon application.

C: Distinct changes were observed in viscosity, appearance and the like. May coarse particles were formed. A viscosity increase took place.

D: No longer remained as a uniform emulsion due to separation and/or solidification.

(7) Dryability test

Similarly to the coating film test, each wax emulsion was coated on one of the black coated plate. The plate was immediately placed in a constant-temperature chamber which was controlled at 50° C. and an air velocity of 3 m/sec, whereby the plate was dried. The plate was then sprayed for 5 minutes with water from a shower which was connected to a faucet of a sink. The drying time required to render the barrier film free from blister and separation was recorded as its rain-resistant drying time. The results were expressed by the following ranking system:

A: Dried within 1 minute.
B: More than 1 minute was required for drying.

EXAMPLES 2-4

In a similar manner to Example 1, water-based compositions according to the present invention, which were useful in protecting coating films, were prepared using the same components in the proportions given in Table 1. Performance evaluation tests were conducted as in Example 1. The results are also shown in Table 1.

EXAMPLE 5

In a similar manner to Example 1, a water-based composition according to the present invention, which was useful in protecting coating films, was prepared using the same components in the proportions given in Table 1 except that the oxygen-containing wax employed in Example 1 and oxidized paraffin wax having an oxygen content of 3.5% and a melting point of 80° C. were used as the component (b). Performance evaluation tests were conducted as in Example 1. The results are also shown in Table 1.

EXAMPLE 6

In a similar manner to Example 1, a water-based composition according to the present invention, which was useful in protecting coating films, was prepared using the same components in the proportions given in Table 1 except for the use of a calcium-modified wax as the component (d). Performance evaluation tests were conducted as in Example 1. The results are also shown in Table 1.

EXAMPLE 7

In a similar manner to Example 1, a water-based composition according to the present invention, which was useful in protecting coating films, was prepared using the same components and also polybutene in the proportions given in Table 1. Performance evaluation tests were conducted as in Example 1. The results are also shown in Table 1.

COMPARATIVE EXAMPLES 1-5

For the sake of comparison, in accordance with the compositions given in Table 1, water-based compositions were prepared in a similar manner to Example 1 except that polyisobutylene was used in lieu of the component (c) (Comparative Example 1), polybutene was used instead of the component (c) (Comparative Example 2), atactic polypropylene was used in place of the component (c) (Comparative Example 3), the component (b) was omitted (Comparative Example 4), and component (d) was omitted (Comparative Example 5). Similar evaluation tests to Example 1 were also conducted with respect to those compositions. The results are also shown in Table 1.

TABLE 1

| | | Example |||||||
|---|---|---|---|---|---|---|---|---|
| | | 1 | 2 | 3 | 4 | 5 | 6 | 7 |
| Composition (wt. parts) | | | | | | | | |
| A | (a) Petroleum fraction wax | 100 | 100 | 100 | 100 | 100 | 100 | 100 |
| | (b) Oxygen-containing wax | 50 | 50 | 50 | 66.7 | 38.9 | 50 | 50 |
| | Oxidized paraffin wax | — | — | — | — | 11.1 | — | — |
| | (c) Ethylene/α-olefin copolymer | 33.3 | 33.3 | 44.4 | 33.3 | 33.3 | 33.3 | 22.2 |
| | Polyisobutylene | — | — | — | — | — | — | — |
| | Polybutene | — | — | — | — | — | — | 11.1 |
| | Atactic polypropylene | — | — | — | — | — | — | — |
| A | (d) Higher fatty acid metal salt | 11.1 | 11.1 | 11.1 | 11.1 | 11.1 | — | 11.1 |
| | Metal-modified wax | — | — | — | — | — | 11.1 | — |
| B | Morpholine | 16.7 | 16.7 | 16.7 | 16.7 | 16.7 | 16.7 | 16.7 |
| | Water | 361 | 344 | 333 | 328 | 344 | 322 | 344 |
| Evaluation of performance | | | | | | | | |
| (1) Appearance of barrier coat | | Clear Smooth | Clear Smooth | Clear Smooth | Clear Smooth | Clear Smooth | Clear Smooth | Clear Smooth |
| (2) Heat resistance test | | B | A | A | B | B | A | A |
| (3) Accelerated weatherability test | State of coating film | A | A | A | B | B | A | B |
| | Removability | B | A | B | B | B | A | B |
| (4) Protection test | Smog resistance | A | A | A | A | A | A | A |
| | Sulfuric acid resistance | A | A | A | A | A | A | A |
| (5) Outdoor weatherability test | State of barrier coat | B | A | A | C | C | A | A |
| | State of coating film | A | A | A | B | B | A | A |
| | Removability | B | A | B | B | C | A | B |
| (6) Emulsion stability test | | B | A | B | A | C | B | B |
| (7) Dryability test | | A | A | A | A | A | A | A |

| | Comparative Example ||||| |
|---|---|---|---|---|---|
| | 1 | 2 | 3 | 4 | 5 |
| Composition (wt. parts) | | | | | |

TABLE 1-continued

| | | | | | | | |
|---|---|---|---|---|---|---|---|
| A | (a) | Petroleum fraction wax | 100 | 100 | 100 | 100 | 100 |
| | (b) | Oxygen-containing wax | 50 | 50 | 50 | — | 50 |
| | | Oxidized paraffin wax | — | — | — | — | — |
| | (c) | Ethylene/α-olefin copolymer | — | — | — | 33.3 | 33.3 |
| | | Polyisobutylene | 33.3 | — | — | — | — |
| | | Polybutene | — | 33.3 | — | — | — |
| | | Atactic polypropylene | — | — | 33.3 | — | — |
| A | (d) | Higher fatty acid metal salt | 11.1 | 11.1 | 11.1 | 11.1 | — |
| | | Metal-modified wax | — | — | — | — | — |
| B | | Morpholine | 16.7 | 16.7 | 16.7 | 16.7 | 16.7 |
| | | Water | 344 | 344 | 344 | 394 | 356 |
| Evaluation of performance | | | | | | | |
| (1) | Appearance of barrier coat | | Clear Smooth | Clear Smooth | Clear Smooth | Uneven | Clear Smooth |
| (2) | Heat resistance test | | A | A | A | C | C |
| (3) | Accelerated weatherability test | State of coating film Removability | B D | B D | B D | D C | C B |
| (4) | Protection test | Smog resistance Sulfuric acid resistance | A A | A A | A A | C C | B B |
| (5) | Outdoor weatherability test | State of barrier coat State of coating film Removability | C C D | D B C | C C D | D D C | D D C |
| (6) | Emulsion stability test | | D | B | D | D | B |
| (7) | Dryability test | | A | A | A | C | B |

As is apparent from the results of the performance evaluation in Table 1, the compositions of Examples 1-7 all of which pertain to the present invention showed excellent performance under severe conditions in the evaluation of all the performances including the strength and removability of protective barrier coats, the properties of coating films after the removal of barrier coats, emulsion stability and dryability.

In contrast, the compositions of Comparative Examples 1 and 3 in which the polyisobutylene and atactic polypropylene were used respectively instead of the component (c) gave poor results in the accelerated weatherability test (3), the removability test of the outdoor weatherability test (5) and the emulsion stability test (6). Further, the composition of Comparative Example 2 in which polybutene was used in place of the component (c) showed poor removability in the accelerated weatherability test (3) and gave poor barrier coats in the outdoor weatherability test (5). In addition, the composition of Comparative Example 4 in which the component (b) was omitted gave poor results in almost all the test items and was not usable actually. The composition of Comparative Example 5 in which the component (d) was omitted gave poor results in the heat resistance test (2) and the outdoor weatherability test (5).

What is claimed is:

1. A water-based protective composition for coating films, which comprises, in a form emulsified and dispersed in water, the following essential components:
   (A) 100 parts by weight of a disperse phase component comprising:
   (a) 100 parts by weight of a petroleum fraction wax having a melting point of 50°-90° C.
   (b) 20-75 parts by weight of an oxygen-containing wax having an oxygen content of at least 3.0 wt. % and a melting point of 50°-85° C.,
   (c) 10-50 parts by weight of an ethylene/α-olefin copolymer having a number average molecular weight of 2,000-20,000, and
   (d) 5-30 parts by weight of a higher fatty acid metal salt and/or a metal-modified hard wax; and
   (B) 1-20 parts by weight of an emulsified component, and said disperse phase component (A) and said emulsifier component (B) are in a total amount of 5-100 parts by weight per 100 parts by weight of water.

2. The composition of claim 1, wherein the petroleum fraction wax (a) has a melting point of 65°-85° C.

3. The composition of claim 1, wherein the petroleum fraction wax (a) is selected from petroleum fraction waxes consisting of paraffin wax, microcrystalline wax, slack wax and scale wax.

4. The composition of claim 1, wherein the oxygen-containing wax (b) has an oxygen content of at least 5 wt. %.

5. The composition of claim 1, wherein the oxygen-containing wax (b) is selected from natural waxes consisting of carnauba wax, montan wax, rice-bran wax, beeswax and japan wax as well as synthetic waxes consisting of oxidized microcrystalline wax and oxidized paraffin wax, secondary modified products thereof, and maleic waxes.

6. The composition of claim 1, wherein the proportion of the oxygen-containing wax (b) is 30-60 parts by weight per 100 parts by weight of the petroleum fraction wax (a).

7. The composition of claim 1, wherein the copolymer (c) has a number average molecular weight of 5,000-10,000.

8. The composition of claim 1, wherein ethylene moieties amount to 35-65 wt. % of the copolymer (c).

9. The composition of claim 1, wherein ethylene moieties amount to 45-60 wt. %.

10. The composition of claim 1, wherein the α-olefin has 3-50 carbon atoms.

11. The composition of claim 1, wherein the α-olefin of the copolymer (c) comprises at least one α-olefin selected from the group consisting of propylene, 1-butene, 1-pentene, 1-hexene, 4-methyl-1-pentene, 3-methyl-1-pentene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene.

12. The composition of claim 1, wherein the proportion of the copolymer (c) is 25-40 parts by weight per 100 parts by weight of the petroleum fraction wax (a).

13. The composition of claim 1, wherein the higher fatty acid metal salt (d) is an alkali or alkaline earth metal salt of a fatty acid having 12-18 carbon atoms.

14. The composition of claim 1, wherein the higher fatty acid metal salt (d) comprises at least one higher fatty acid metal salt selected from the group consisting of lithium laurate, sodium laurate, potassium laurate, magnesium laurate, calcium laurate, barium laurate, aluminum laurate, zinc laurate, lithium myristate, sodium myristate, potassium myristate, magnesium myristate, calcium myristate, barium myristate, aluminum myristate, zinc myristate, lithium palmitate, sodium palmitate, potassium palmitate, magnesium palmitate, calcium palmitate, barium palmitate, aluminum palmitate, zinc palmitate, lithium stearate, sodium stearate, potassium stearate, magnesium stearate, calcium stearate, barium stearate, aluminum stearate and zinc stearate.

15. The composition of claim 1, wherein the metal-modified hard wax has been obtained by modifying, with a metal, a petroleum fraction wax selected from paraffin wax, microcrystalline wax, slack wax and scale wax, a synthetic wax selected from polyethylene wax, oxidized micro-crystalline wax, oxidized paraffin wax and a maleic wax, or a natural wax selected from carnauba wax, montan wax, rice-bran wax, beeswax and japan wax.

16. The composition of claim 1, wherein the metal is selected from alkaline earth metals consisting of magnesium, calcium and barium.

17. The composition of claim 1, wherein the proportion of the higher fatty acid metal salt (d) is 10-20 parts by weight per 100 parts by weight of the petroleum fraction wax (a).

18. The composition of claim 1, wherein the emulsifier component [B] is a cation emulsifier selected from morpholine or a nonionic emulsifier selected from polyoxyethylene alkylphenyl ethers, polyoxyethylene alkyl ethers, sorbitan fatty acid esters and polyoxyethylene sorbitan fatty acid esters.

19. The composition of claim 17, wherein the emulsifier component [B] comprises the cation emulsifier and, further, an anion emulsifier composed of oleic acid in an amount smaller than the equivalent weight of the cation emulsifier.

20. The composition of claim 1, wherein the proportion of the emulsifier component [B] is 6-15 parts by weight per 100 parts by weight of the disperse phase component [A].

21. The composition of claim 1, further comprising at least one of antioxidants, ultraviolet absorbers and wax dispersants.

* * * * *